Figures 1, 2:
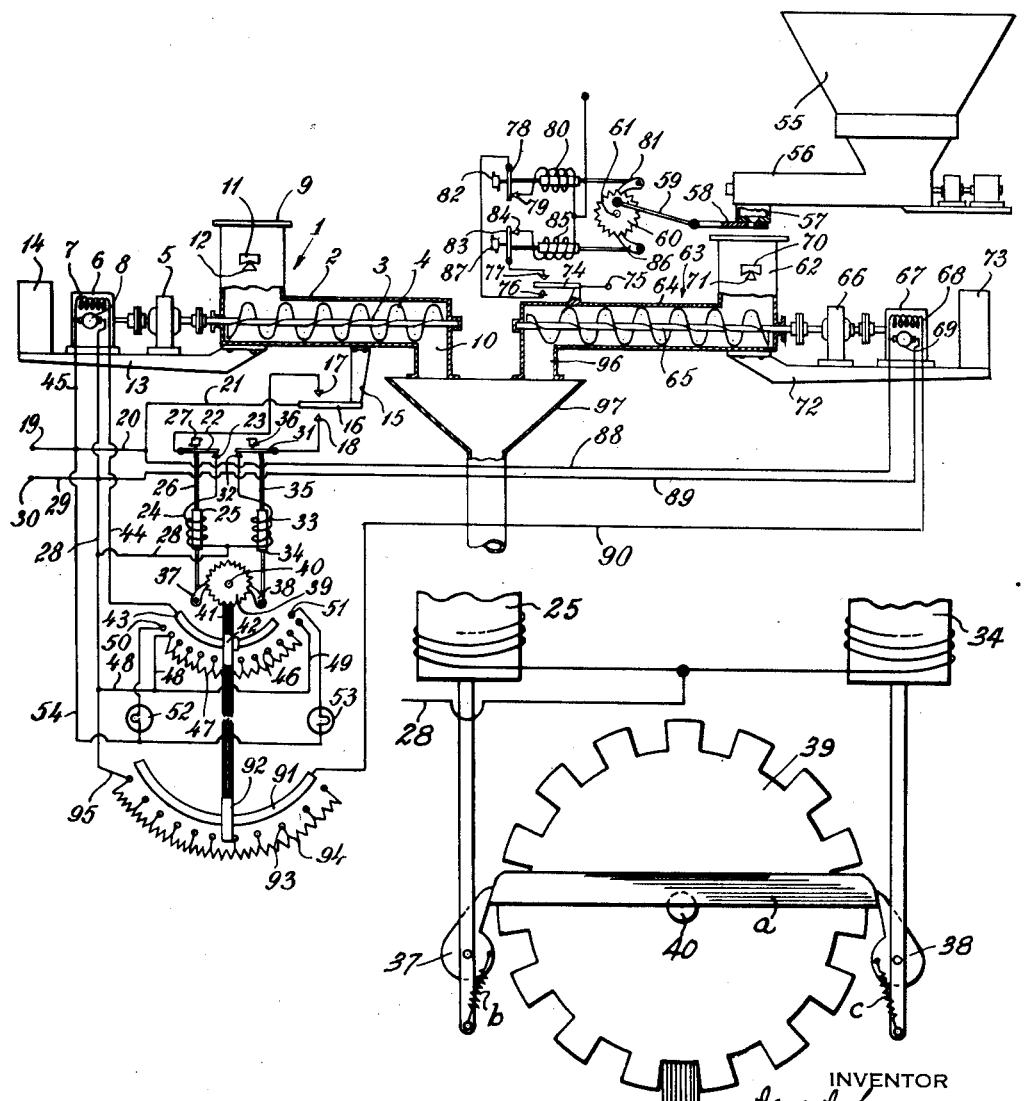

Dec. 30, 1952    J. JOHANSEN    2,623,658
APPARATUS FOR FEEDING MATERIALS AT CONSTANT RATIOS
Filed July 31, 1947

INVENTOR
Jens Johansen
BY
Pennie Edmonds Morton Barrows
ATTORNEYS

Patented Dec. 30, 1952

2,623,658

UNITED STATES PATENT OFFICE 2,623,658

APPARATUS FOR FEEDING MATERIALS AT CONSTANT RATIOS

Jens Johansen, Copenhagen, Denmark, assignor to F. L. Smidth & Co., New York, N. Y., a corporation of New Jersey Application July 31, 1947, Serial No. 765,086
In Denmark July 19, 1944

4 Claims. (Cl. 222—57)

This invention relates to the feeding of granular and pulverulent materials from a plurality of sources and is concerned more particularly with a novel apparatus for feeding, at a constant weight ratio, granular or pulverulent materials from different sources, one of the materials being supplied at a fluctuating rate. The apparatus of the invention may be used in various applications as, for example, for the purpose of producing a mixture of ingredients, one of which is being discharged at a fluctuating rate from a mill, in which it is being ground.

In my copending application Serial No. 760,586, filed July 12, 1947, now patent No. 2,549,908, I have described a method and apparatus for conveying granular or pulverulent material, in the use of which the material is passed through a conveying mechanism at a speed varying directly with variations in the weight of the material in the mechanism. The cross-section of the material in the mechanism thus varies inversely with variations in the weight of the material in the mechanism and the material is delivered in a stream, which has an approximately constant weight per unit of length. The apparatus of the present invention make use of the invention of the copending application but include additional features by means of which the flow of two or more materials at a constant weight ratio may be maintained.

In using the present apparatus, the material which is supplied at a fluctuating rate is fed to conveying means automatically controlled, so that the speed at which the conveying means feeds the material, varies directly with variations in the weight of the material carried by the conveying means. The second material, which is to be fed at a constant weight ratio relative to the first, is fed to another conveying means, which is automatically controlled so that, at a given rate of operation, the weight of material discharged per unit of time is substantially constant. The control means for the two conveyors are interconnected and when the first conveyor is speeded up because of an increase in the weight of the material thereon, the second conveyor is likewise speeded up. This causes a decrease in the weight of the material carried by the second conveyor and the supply of material thereto is then proportionately increased. As a result, the speed of both conveyors varies directly with variations in the weight of the material carried by the first conveyor and the supply of material to the second conveyor is varied inversely with the variations of the weight of the material carried thereby. The materials are thus discharged from the conveyors at a constant weight ratio.

For a better understanding of the invention, reference may be made to the accompanying drawing, in which Fig. 1 is a view in side elevation of one form of apparatus of the invention, certain parts being broken away and others shown diagrammatically, and Fig. 2 is a diagrammatic detail view on an enlarged scale.

The apparatus illustrated in the drawing includes a screw conveyor 1 comprising a casing 2 and a shaft 3 carrying screw flights 4. The shaft extends out of the casing and is connected through a gear reduction box 5 to a motor 6 having a field winding 7 and an armature 8, the winding and armature being shown diagrammatically. The conveyor 1 has an inlet 9 and an outlet 10 and it is mounted for swinging movement in a vertical plane by means of projections 11 attached to the inlet and resting on knife edges 12 on suitable supports (not shown). The gear reduction box and motor are supported on a beam 13 attached to the casing and the weight of the motor and gear box, together with a counter-weight 14 carried by the beam 13, balance the weight of the conveyor and the material therein.

A bracket 15 is attached to the conveyor at one side of the axis, on which it swings, and the bracket carries a switch blade 16 movable between fixed contact 17, 18. Blade 16 is connected to one terminal 19 of a source of power through a main line 20 and a branch line 21. Contact 17 is connected to a movable switch arm 22, which is engageable with a fixed contact 23. Contact 23 is connected to one end of a solenoid 24 having a core 25 with an extension 26, which terminates close to switch blade 22. When the solenoid is energized and the core rises, the extension 26 moves blade 22 away from contact 23 and breaks the circuit through the solenoid. Blade 22 is then moved back into engagement with contact 23 by a slow return device 27. Solenoid 24 is connected by a line 28 to a main return line 29 connected to the other terminal 30 of the source of power.

Contact 18 is connected to a movable blade 31 engageable with a fixed contact 32 connected to one end of a solenoid 33, the other end of which is connected to return line 28. Solenoid 33 has a core 34 with an extension 35, and when the solenoid is energized, the core rises and the extension moves blade 31 away from contact 32 to open the circuit through the solenoid. The core then falls and blade 31 is moved back into engagement with contact 32 by a slow return device 36.

At their lower ends, cores 25 and 34 of the solenoids are provided with pawls 37, 38 acting on a wheel 39 attached to a shaft 40. An arm 41 fast on the shaft carries a contact plate 42 movable along a curved contact bar 43, one end of which is connected through line 44 to one end of the motor winding 7. The other end of the winding is connected to one end of the armature 8 and by a line 45 to the main supply line 20. The contact plate 42 on arm 41 is also movable along the contacts 46 of a rheostat 47, one end contact of which is connected through line 48 to line 28. The other end contact of the rheostat is connected to the line 48 by line 49. Contacts 50, 51 mounted adjacent the ends of the rheostat are connected through lamps 52, 53 to line 54, which is connected to the main supply line 20.

The manner in which the ratchet 39 is operated is shown in Fig. 2. A stationary guide $a$ extends across the ratchet wheel between the pawls 37 and 38. The pawls are resiliently retained against the ends of the guide by springs $b$ and $c$, respectively, and the guide is of such length that it keeps both pawls out of engagement with the teeth of the ratchet when the pawls are not actuated by their respective solenoids. When one of the pawls is pulled upwardly by its solenoid it slides over the end of the guide and into the first notch of the ratchet, and on further movement of the solenoid turns the ratchet. During such movement of either pawl, the other pawl is maintained in engagement with the other end of the guide, so that it does not prevent rotation of the ratchet wheel. When the movement of the actuated pawl is completed, it will return to the position shown, where it rests on its end of the guide $a$, whereupon the ratchet wheel is again free to be actuated again, by either of the pawls.

In the operation of conveyor 1, material delivered at a fluctuating rate from a source, such as a grinding mill, enters the casing 2 through inlet 9 and, when the weight of the material within the casing is that for which the conveyor is to balance, the screw shaft runs at a uniform speed. If the weight of the material within the conveyor increases because of a surge in the supply, the conveyor swings clockwise and blade 16 engages terminal 18. A circuit is then established from terminal 19 of the source of power through lines 20, 21, blade 16, contact 18, blade 31, contact 32, solenoid 33, line 28, and line 29 to terminal 30. The solenoid 33 is thereupon energized and its core is raised, pawl 38 advances its ratchet wheel 39 by one tooth, and shaft 40 is moved counter-clockwise through one step. Extension 35 of the core breaks the circuit through the solenoid by raising blade 31 from contact 32 and the solenoid is then de-energized and the core drops.

Current is supplied to the winding 7 of the motor through a circuit from terminal 19, line 45, winding 7, contact 43, contact plate 42, resistor 47, line 48, line 28 and return line 29. The counter-clockwise movement of shaft 40 increases the amount of resistance in the winding circuit and the motor speed is accordingly increased. This increases the rate of rotation of the conveyor shaft 3 and decreases the amount of material between the flights of screw 4. The cross-section of the stream of material in the conveyor is, accordingly, decreased.

If the first adjustment of the resistance in the field winding circuit does not produce an increased speed of the conveyor shaft sufficient to reduce the weight of the material in the conveyor to the desired extent, the conveyor remains down and blade 16 remains in engagement with contact 18. After an interval, the slow return device 36 moves blade 31 into engagement with contact 32 and solenoid 33 is again energized with the result that shaft 40 is turned counter-clockwise another step and more resistance is introduced into the field winding circuit. The adjustments continue as described, until the conveyor comes into balance, but, if the unbalanced condition continues until shaft 40 has swung, so that contact 42 engages contact 51, lamp 53 is illuminated and the operator is thereby warned that the limit of automatic regulation has been reached.

Whenever a lighter material is fed to the conveyor, when the latter is in balanced condition, the conveyor swings counter-clockwise and blade 16 engages contact 17. This causes solenoid 24 to be energized and, upon the raising of its core, shaft 40 is moved clockwise one step. This movement of the shaft swings arm 41 to decrease the resistance in circuit with the motor winding 7 and the motor slows down. The amount of material between the flights of the screw then increases and the cross-section of the stream of material in the conveyor correspondingly increases. Since the speed of operation of the conveyor varies directly with variations in the weight of the material carried by the conveyor and the cross-section of the stream of material varies inversely with the weight of the material in the conveyor, the stream of material delivered by the conveyor has an approximately constant weight per unit of length.

The material, which is to be fed at a constant weight ratio with reference to that delivered by conveyor 1, may be contained in a storage vessel 55, from which it may be supplied by a screw conveyor 56, the outlet 57 of which is provided with an orifice controlled by a valve plate 58 connected by a link 59 to an eccentric pin on a ratchet wheel 60 on shaft 61. Material discharged from outlet 57 enters the inlet 62 of a screw conveyor 63 having a casing 64 containing a shaft 65 provided with screw flights. Shaft 65 is connected through a gear reduction box 66 to the shaft of a motor 67 having a field winding 68 and an armature 69. The conveyor 63 is mounted for swinging movement in a vertical plane by means of projections 70 resting on knife edges 71 on supports (not shown), and, to balance the weight of the conveyor and its load, the gear reduction box 66 and motor 67 are mounted on a beam 72, attached to the conveyor casing, and a counter-weight 73 is also mounted on the beam.

A switch blade 74 connected to terminal 75 of a source of power is mounted on a bracket on casing 64 and lies between fixed contacts 76, 77. Contact 76 is connected to a movable switch blade 78 engageable with a fixed contact 79, which is connected to one end of a solenoid 80, the other end of which is grounded. The core of the solenoid carries a pawl 81 engageable with ratchet wheel 60 and, when the solenoid is energized, the pawl is moved to advance the ratchet wheel and shaft 61 counter-clockwise by one tooth on the ratchet wheel. In such movement of the core it engages blade 78 and frees it from contact 79, so that the solenoid is de-energized, and the core is moved back to its original position by suitable means (not shown). The blade 78 is then restored to engagement with contact 79 by a slow return device 82.

Contact 77 is connected to a switch blade 83 engageable with a fixed contact 84 connected to one end of a solenoid 85, the other end of which is grounded. Solenoid 85 has a core carrying a pawl 86 engageable with ratchet wheel 60 and, upon energization of the solenoid, the pawl turns the ratchet wheel 60 and shaft 61 in a clockwise direction by one tooth on the ratchet wheel, in a manner similar to that in which the ratchet wheel 39 is actuated. In this movement of the core, it engages blade 83 and frees it from contact 84, so that the solenoid is deenergized and the core is moved to its original position by means (not shown). Blade 83 is then moved back into engagement with contact 84 by a slow return device 87.

The power terminal 19 is connected through main line 20 and line 88 to one end of winding 68 and one end of armature 69 of motor 67, and the other end of the armature is connected by a line 89 and return line 29 to the other power terminal 30. The other end of the winding 68 is connected by line 90 to a curved contact bar 91. Arm 41 attached to shaft 40 carries a contact member 92 movable along contact 91 and connecting it to contacts 93 of rheostat 94, one end of which is connected by a line 95, line 28 and return line 29 to power terminal 30.

The operation of conveyor 63 is as follows: Material withdrawn from the supply vessel 55 is fed through valve plate 58 into inlet 62 of conveyor 63, and, so long as the conveyor contains a selected weight of the material, it remains in balance, and the material is fed from the conveyor at a constant rate through outlet 96. At the same time, material is issuing through outlet 10 of conveyor 1, and the two materials may be discharged into a hopper 97 and delivered to a storage point. Whenever, because of a fluctuation in the rate of supply, the weight of the material carried by conveyor 1 departs from the value, for which the conveyor is in balance, the conveyor swings about knife edges 12 and the speed of motor 6 is varied directly with variations in the weight of the material in the conveyor. This adjustment in speed of motor 6 is effected by an angular movement of shaft 40 and, whenever the shaft moves, it varies the amount of resistance provided by rheostat 94 in the winding 68 of motor 67. The arrangement is such that the speed of motor 67 varies directly with the speed of motor 6, so that, if the weight of the material in conveyor 1 increases, the speed of both conveyors is increased and, if the weight of the material in conveyor 1 decreases, the speed of both conveyors is decreased.

Whenever the amount of material in conveyor 63 decreases as a result of an increase in speed of motor 67, the conveyor swings clockwise and blade 74 engages contact 77. Solenoid 85 is thereupon energized and ratchet wheel 60 and its shaft 61 are advanced angularly one step. This causes a movement of valve plate 58 to increase the flow of material through outlet 57 into the inlet 62 of the conveyor. If the speed of shaft 65 is decreased, so that the weight of material in conveyor 63 increases and the conveyor moves counter-clockwise, blade 74 engages contact 76 and solenoid 80 is energized. As a result, shaft 61 is moved angularly one step counter-clockwise and valve plate 58 is moved to decrease the supply of material to the conveyor.

Fluctuations in the rate of supply of material to the conveyor 1, which result in variations in the weight of the material in the conveyor, cause corresponding variations in the speed of both conveyor shafts. As the load of material in conveyor 63 varies, the supply of material to that conveyor is varied inversely. The materials supplied to the two conveyors are, therefore, delivered by the conveyors at a constant weight ratio, which may be varied by changing the counterweights of one or both conveyors.

The apparatus above described includes a pair of conveyors and feeds two materials at a constant weight ratio. For feeding additional materials, additional conveyors are provided and all the conveyors are driven at rates varying with variations in the weight of the material supplied at a fluctuating rate.

I claim:

1. Apparatus for feeding at a uniform weight ratio two materials, one of which is delivered from a source at a fluctuating rate, which comprises a pair of conveyors, each mounted to move from a normal position as the weight of material thereon varies from a selected value, a driving means for each conveyor, the driving means being capable of regulation, means for directing to the first conveyor the material delivered at a fluctuating rate, controllable means for supplying the other material to the second conveyor, means operated by the first conveyor, as it moves from its normal position, for regulating both conveyor driving means to vary the speed thereof directly with variations in the weight of the material carried by the first conveyor, and means operated by the second conveyor, as it moves from its normal position, for controlling the supply means to vary the supply of material to the second conveyor inversely with variations in the weight of the material carried thereby.

2. Apparatus for feeding at a uniform weight ratio two materials, one of which is delivered from a source at a fluctuating rate, which comprises a pair of conveyors, each mounted to move from a normal position as the weight of material thereon varies from a selected value, a driving means for each conveyor, the driving means being capable of regulation, means for directing to the first conveyor the material delivered at a fluctuating rate, means for supplying the other material to the second conveyor, valve means for controlling the rate at which said other material is supplied to the second conveyor, means operated by the first conveyor, as it moves from its normal position, for regulating the driving means for both conveyors to vary the speed thereof directly with variations in the weight of the material carried by the first conveyor, and means operated by the second conveyor, as it moves from its normal position, for operating the valve means to vary the supply of material to the second conveyor inversely with variations in the weight of the material carried thereby.

3. Apparatus for feeding at a uniform weight ratio two materials, one of which is delivered from a source at a fluctuating rate, which comprises a pair of conveyors, each mounted to move from a normal position as the weight of material thereon varies from a selected value, a motor driving each conveyor, means for directing to the first conveyor the material delivered at a fluctuating rate, controllable means for supplying the other material to the second conveyor, means operated by the first conveyor, as it moves from its normal position, for varying the operation of the motors to vary the speed of both conveyors directly with variations in the weight of the material carried by the first conveyor, and means operated by the second conveyor, as it moves from its normal position, for regulating the supply means to vary the supply of material to the second conveyor inversely with variations in the weight of the material carried thereby.

4. Apparatus for feeding at a uniform weight ratio two materials, one of which is delivered from a source at a fluctuating rate, which comprises a pair of conveyors, independently mounted to swing from a normal position as the weight of the material thereon varies from a selected value, the first conveyor receiving said material delivered at a fluctuating rate, means for supplying the other material to the second conveyor, means for controlling the rate at which said other material is supplied, a motor driving each conveyor, means operated by the first conveyor, as it moves from its normal position, for regulating the motors of both conveyors to vary the speed of the conveyors directly with variations in the weight of the material carried by the first conveyor, and means operated by the second conveyor, as it moves from its normal position, for operating the control means to vary the rate of supply of material to the second conveyor inversely with variations in the weight of the material carried thereby.

JENS JOHANSEN.

REFERENCES CITED

The following references are of record in the file of this patent:

UNITED STATES PATENTS

| Number | Name | Date |
|---|---|---|
| 1,601,811 | Church | Oct. 5, 1926 |
| 1,641,488 | Merrick | Sept. 6, 1927 |
| 1,777,670 | Hausman | Oct. 7, 1930 |
| 2,206,237 | Roberts | July 2, 1940 |
| 2,289,186 | Flint | July 7, 1942 |